United States Patent [19]
Bloom et al.

[11] Patent Number: 6,061,663
[45] Date of Patent: May 9, 2000

[54] INDEX REBALANCING

[75] Inventors: Steven M. Bloom, Caldwell, N.J.; Peter T. Canada, Bethesda, Md.; Fanie Gouws, Chatham, N.J.; Douglas T. Holmes, Dover, Mass.

[73] Assignee: The Nasdaq Stock Market, Inc., Washington, D.C.

[21] Appl. No.: 09/063,535

[22] Filed: Apr. 21, 1998

[51] Int. Cl.[7] .................................................. G06F 17/60
[52] U.S. Cl. .............................................. 705/36; 705/37
[58] Field of Search ......................................... 705/36, 37

[56] References Cited

U.S. PATENT DOCUMENTS 5,819,238  10/1998  Fernholz ................................... 705/36

OTHER PUBLICATIONS

"Regulated investment companies", Code Sec. 851(b)(4)(B), pp. 3, 119–3, 120.
"Options on The Biotechnology Index", Capmark, pp. 2–7.
"The Merrill Lynch 100 Technology Index (MLO)", Merrill Lynch & Co., Feb. 1998, pp. 1–12.
"Securities and Exchange Commission", Release No. 34–37696, Sep. 1996, pp. 1–19.
"Securities and Exchange Commission", Release No. 34–38852, Jul. 1997, pp. 1–8.
Diversity–Weighted Indexing, Robert Fernholz et al, The Journal of Portfolio Management, vol. 24, No. 2, pp. 74–82.

*Primary Examiner*—Emanuel Todd Voeltz
*Assistant Examiner*—William R. McCarty
*Attorney, Agent, or Firm*—Fish & Richardson P.C.

[57] ABSTRACT

A computer system including a processor and a storage device storing a computer program product for rebalancing a capitalization weighted stock index are described. The computer program includes instructions for causing a computer to classify stocks in the index as a Large Individual Stock if a stock has a capitalization weight above or equal to a first threshold or as a Small Individual Stock if the stock has a capitalization weight below the first threshold. The computer program causes the computer to scale down the Large Individual Stocks by an excess capitalization weight of the large stocks and distribute an aggregated excess capitalization weight of the Large Individual Stocks over the capitalization weights of the Small Individual Stocks. An iterative redistribution of excess capitalization over all Small Individual Stocks can be used to provided for less than proportional distribution of excess capitalization to very small capitalized stocks. The index rebalancing software retains a capitalization weighting characteristic while permitting the index to conform to generally accepted accounting, economic and tax standards. Index rebalancing is accomplished while maintaining the original relative position of stocks and reducing the market impact of rebalancing on the Small Individual Stock group.

35 Claims, 8 Drawing Sheets

INDEX REBALANCING

BACKGROUND

This invention relates to index rebalancing techniques.

Stock indexes are used to track the performance of a group of stocks. There are several types of stock indexes including capitalization weighted stock indexes, price weighted stock indexes and so forth. In a capitalization weighted stock index often one or more stocks in the stock index will have a substantially higher capitalization weight than remaining stocks in the index. Significant concentration in the capitalization weight of a few high capitalized stocks may dominate the overall performance of the index.

SUMMARY

In one aspect of the present invention, a computer program product stored on a computer readable medium for rebalancing a capitalization weighted stock index includes instructions for causing a computer to classify stocks in the index as a Large Individual Stock if a stock has a capitalization weight above or equal to a first threshold or as a Small Individual Stock if the stock has a capitalization weight below the first threshold. The computer program causes the computer to scaled down the Large Individual Stocks by an excess capitalization weight of the large stocks, and distributes an aggregated excess capitalization weight of the Large Individual Stocks over the capitalization weights of the Small Individual Stocks. The computer program product also includes instructions that cause the computer to iteratively distribute the excess aggregate capitalization weight of the Large Individual Stocks over the Small Individual Stocks.

In a still further aspect of the invention, the computer program product stored on a computer readable medium for rebalancing a capitalization weighted stock index includes instructions for causing a computer to request a file containing data corresponding to capitalization of stocks in the index, classify stocks in the index as a Large Individual Stock if a stock has a capitalization weight above or equal to a first threshold or as a Small Individual Stock if the stock has a capitalization weight below the first threshold. The program causes the computer to scale Large Individual Stocks in the index in proportion to an excess capitalization weight associated with a stock in the index having the highest capitalization weight if the weight of the stock is greater than a second threshold. The program classifies the Large Individual Stocks as Large Combined Stocks if the capitalization weight of said Large Individual Stocks exceeds a third threshold. The program causes the computer to rescale the weights of the Large Individual Stocks in accordance with excess capitalization weights of the Large Individual Stocks, determine excess aggegate capitalization weight of the Large Individual Stocks, and distribute the excess capitalization weight of the Large Individual Stocks over the Small Individual Stocks.

In a still further aspect of the invention, a method executed on a computer for rebalancing a capitalization weighted stock index includes classifying stocks in the index as a Large Individual Stock if a stock has a capitalization weight above or equal to a first threshold or as a Small Individual Stock if the stock has a capitalization weight below the first threshold, classifying the Large Individual Stocks as Large Combined Stocks if the capitalization weight of said Large Individual Stocks exceeds a second threshold, scaling capitalization weights of Large Individual Stocks by an excess aggregate capitalization weight of the Large Combined Stocks, and distributing an aggregated excess capitalization weight of the Large Individual Stocks over the capitalization weights of the Small Individual Stocks.

Distributing includes determining excess aggregate capitalization weight of the Large Individual Stocks, iteratively distributing the excess aggregate capitalization weight of the Large Individual Stocks over the Small Individual Stocks and further including setting the capitalization of a largest one of the Small Individual Stocks to the first threshold, and scaling up remaining Small Individual Stocks in accordance with a capitalization amount required to set the largest one to the first threshold.

The index rebalancing software retains a capitalization weighting characteristic to an index while permitting the index to conform to generally accepted accounting, economic and tax standards. Index rebalancing is accomplished in a manner that maintains the original relative position of stocks in the index while reducing the market impact of rebalancing on the Small Individual Stock group. The iterative redistribution of excess capitalization over all Small Individual Stocks provides for less than proportional distribution of excess capitalization to very small capitalized stocks. This approach is applicable to any index where the number of stocks in the index are fixed and which relies upon a market capitalization basis to determine the position of stocks in the index.

BRIEF DESCRIPTION OF THE DRAWINGS

The foregoing features and other aspects of the invention will be better understood when taken in conjunction with the accompanying drawings, in which.

DETAILED DESCRIPTION

Figure 1:
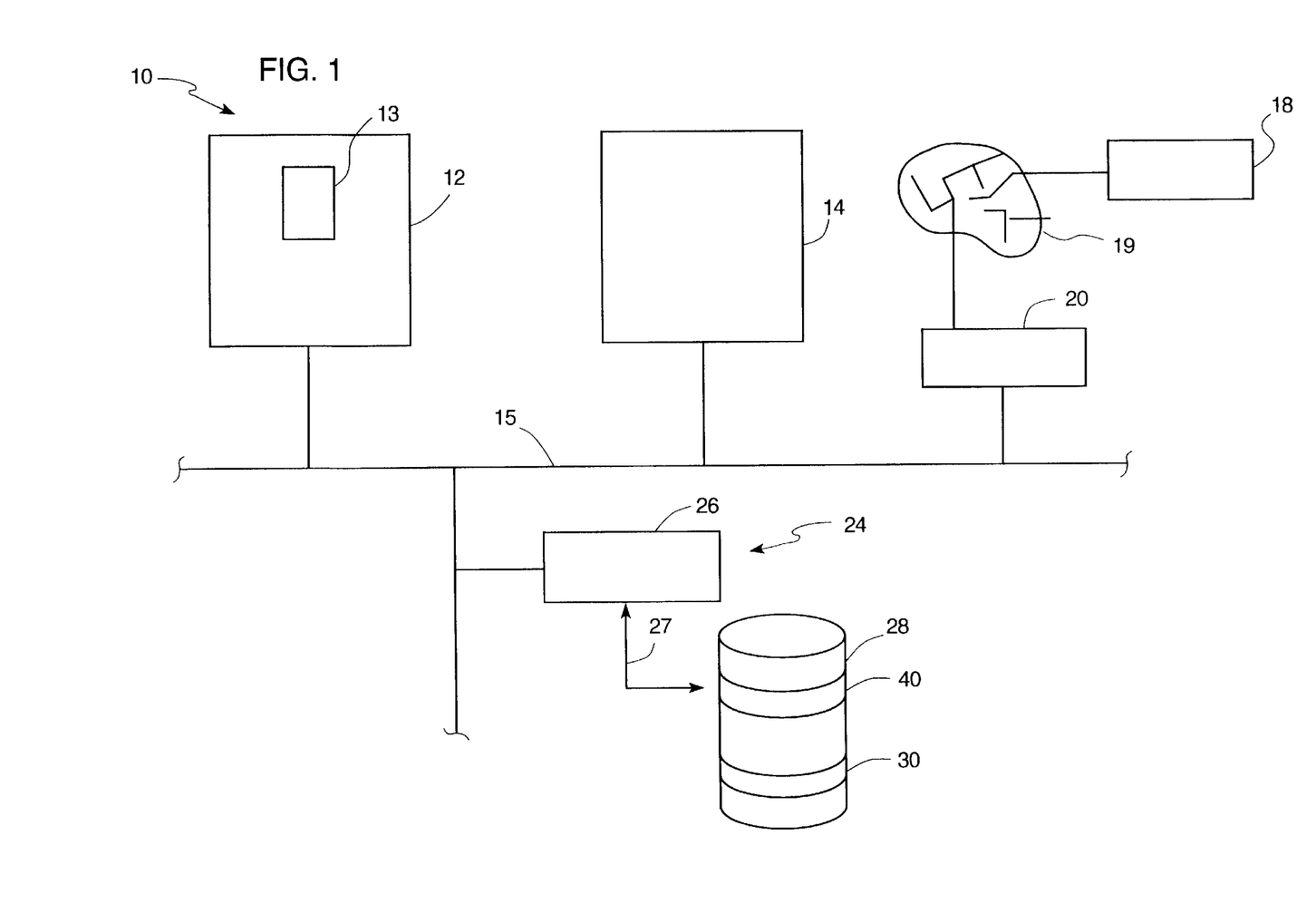
FIG. 1 is a block diagram of a computer system including index rebalancing software.

Referring now to FIG. 1, a computer system 10 includes a processor 12 including a central processor unit 13 and a main memory 14 interconnected by a computer system bus 15. In addition, the computer system 10 has a network interface 20 coupled via a network 19 to another computer system 18. The computer system 10 further includes a storage adapter 26 coupled to the computer system bus 15 and coupled to a disk drive 28 via a storage bus 27. Computer system 18 illustratively provides computer system 10 with current information regarding prices, number of outstanding shares, etc. of stocks contained in a stock index. This information can be communicated over the network 19 to the interface 20. The information can be stored as a file or data structure 30 on the mass storage device 28.

The mass storage device 28 also includes index rebalancing software 40. Index rebalancing software uses the information in file 30 to produce rebalanced index weights for each stock component of a stock index and determines an adjustment factor to ensure a continuity of a value of the index after rebalancing.

The above-described architecture is that of a general purpose, networked computer system. It should be understood that any type of computer system such as a server or non-network personal computer system provided with the information regarding current characteristics of stocks in the index could be used to operate the stock index rebalancing software 40.

Figure 2:
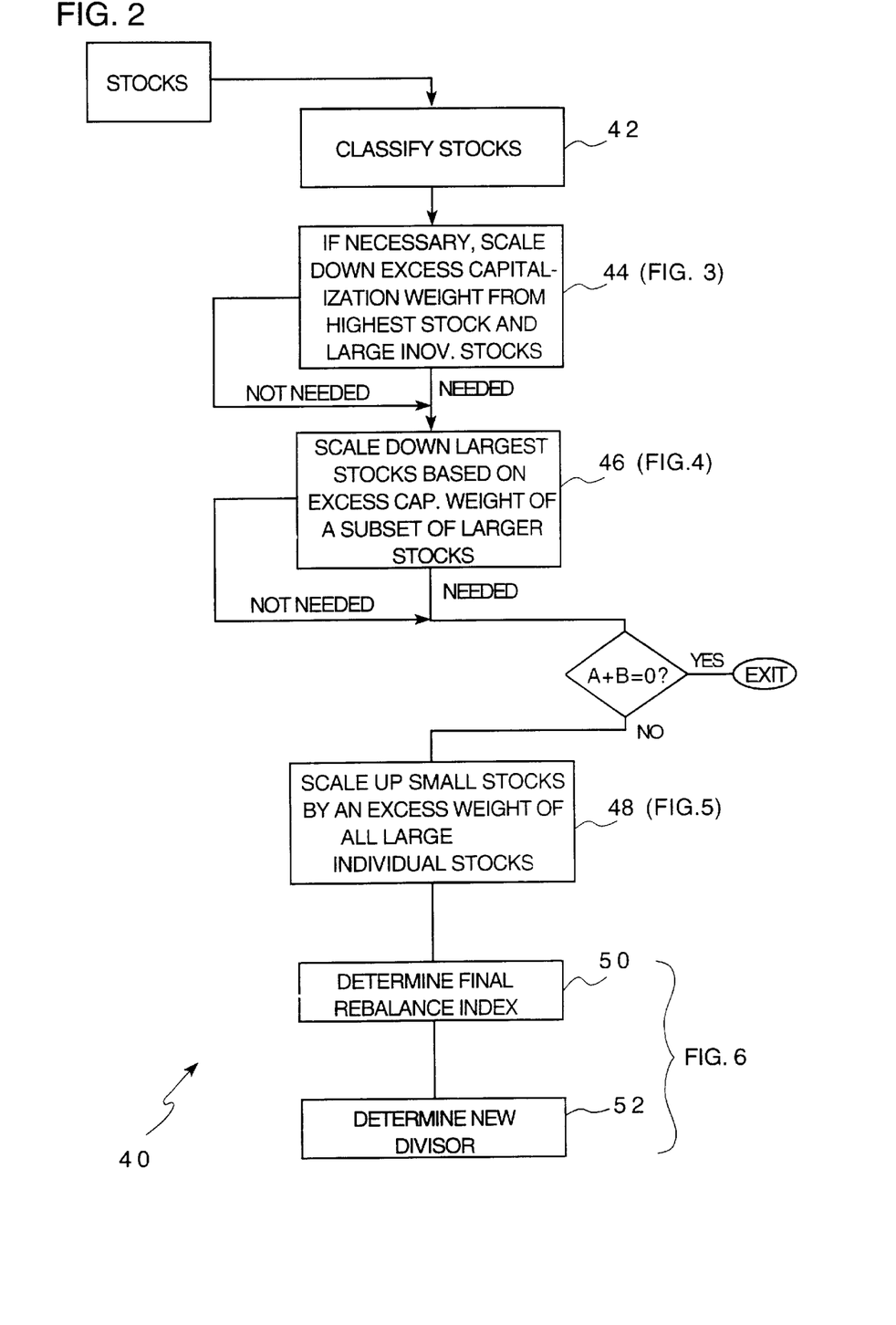
FIG. 2 is a flow chart depicting the index rebalancing software.

Referring now to FIG. 2, the stock index rebalancing software 40 classifies stocks in a stock index according to whether the stock is a Small Individual Stock or a Large Individual Stock. The stock index rebalancing software 40 uses stock information in data structure or file 30 to determine a current percent weight for each stock. As an illustrative example, the index rebalancing software will be described with regard to "The NASDAQ 100 Index®", (The NASDAQ Stock Market, Inc). Other indices, particularly indices which are so-called "capitalization weighted indices", could alternatively be used.

The classifier 42 compares the Current Percent Weights for each stock against an Equal Dollar Weighted Anchor Point threshold for the index. The Current Percent Weights for each of the stocks in the index are calculated by multiplying the number of current index shares for each stock with the current stock price for the stock to provide a total market capitalization. The Current Percent Weight ($CPW_i$) for an $i^{th}$ stock is determined by dividing the total market capitalization for that $i^{th}$ stock by the sum of the total market capitalizations of all stocks in the index, as given by Equation 1 below.

$$CPW_i = S_i * P_i / \Sigma S_j * P_j \qquad \text{Equation 1}$$

where j=1, 2, 3 ... J, J is the number of stocks in the index, S is the number of current index shares of stock, and P is the price per share. The results of this calculation are the Current Percent Weights for each stock.

The Equal Dollar Weighting Anchor Point is a percentage threshold determined by dividing into 100% the number of stocks in the index. Thus, for the NASDAQ 100 Index® the Equal Dollar Weighting Anchor Point (EWAP) equals 1.00%. The index rebalancing software 40 compares a Current Percent Weight (CPW) for each stock to the Equal Dollar Weighting Anchor Point.

The index rebalancing software 40 classifies stocks in this index as belonging to one of three groups, "Large Individual Stocks" "Large Combined Stocks" and "Small Individual Stocks". The index rebalancing software 40 reduces the impact of rebalancing on the Small Individual Stock group. That is, the index rebalancing software 40 provides for less than proportional distribution of excess capitalization to smaller capitalized stocks. This approach is applicable to any index where the number of stocks in the index are fixed and which relies upon a market capitalization basis to determine the percent weight of stocks in the index.

The index rebalancing software 40 determines if rebalancing of the index is necessary according to two different conditions. The index rebalancing software 40 rebalances if there is a stock in the index having a CPW that exceeds a first threshold (e.g. 24%) and/or if the sum of the market capitalization weights of a subset of the Large Individual Stocks exceeds a second threshold (e.g. 48%).

The index rebalancing software 40 rebalances the index so as to distribute excess capitalization weight from Large Individual Stocks to Small Individual Stocks in a manner that reduces the impact on the relatively Smaller Individual Stocks. The index rebalancing software 40 scales down 44 the Large Individual Stocks in the index, if necessary, by an amount proportional to an excess capitalization weight of the highest capitalized stock in the index.

Figure 5:
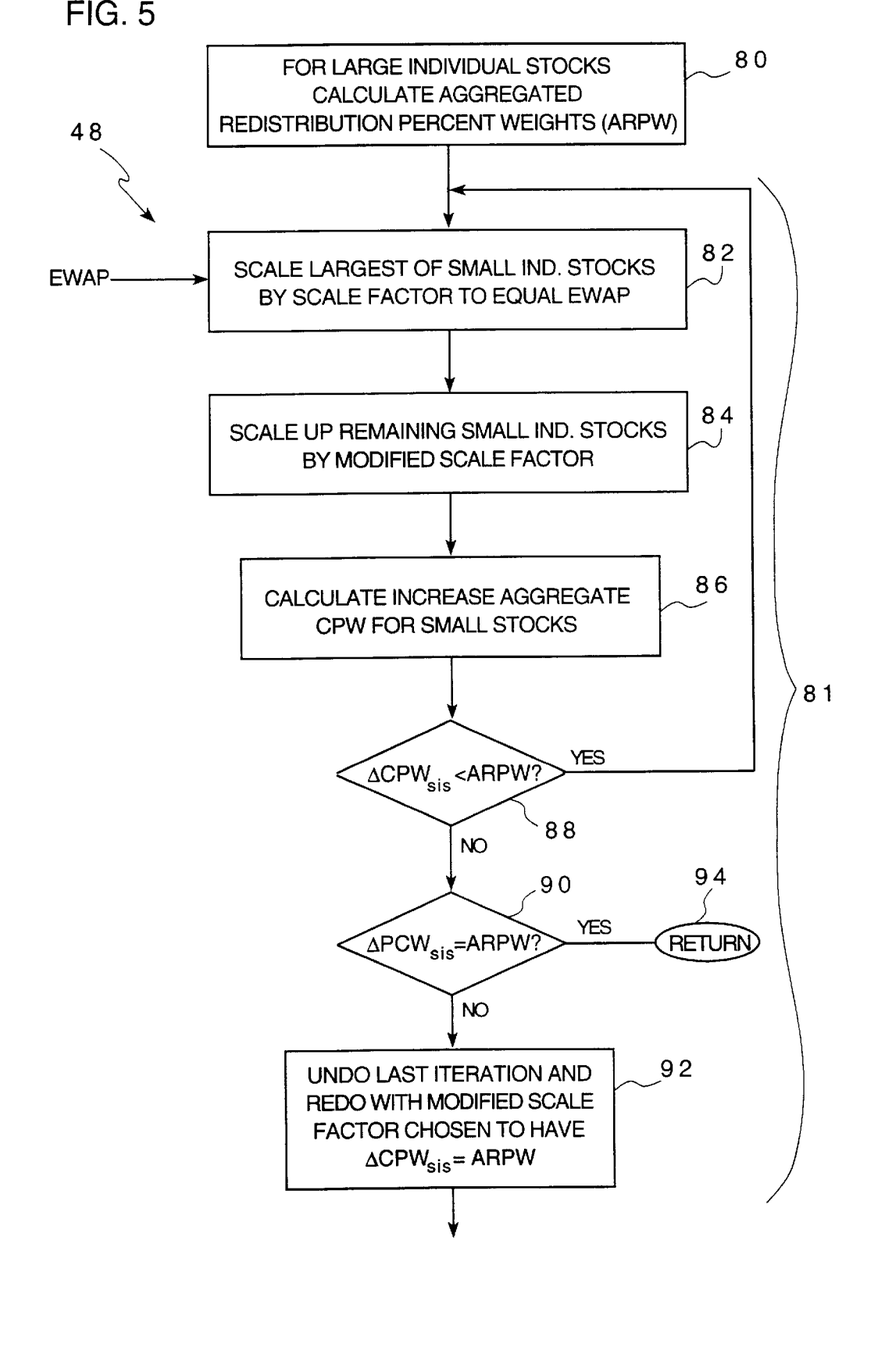
FIG. 5 is a flow chart showing a process to distribute excess capital weight of large stocks over small stocks in the index.

The index rebalancing software 40 also scales down 46 the Large Individual Stocks, if necessary, by an aggregate excess capitalization percent weight of a subset of the largest stocks in the index. The scaled CPWs of each of the Large Individual Stocks is compared to the original CPW for the Large Individual Stock prior to rebalancing to produce an Aggregate Redistribution Percent Weight. The Aggregate Redistribution Percent Weight is distributed 48 over the Small Individual Stocks. In one approach, this weight, as will be described in conjunction with FIG. 5, is distributed over the Small Individual Stocks in an iterative manner.

The index rebalancing software 40 retains a capitalization weighting characteristic permitting the index to conform to generally accepted accounting, economic and tax standards. Moreover, the index rebalancing software 40 rebalances the index while maintaining the original relative position of the stocks in the index.

Figure 3:
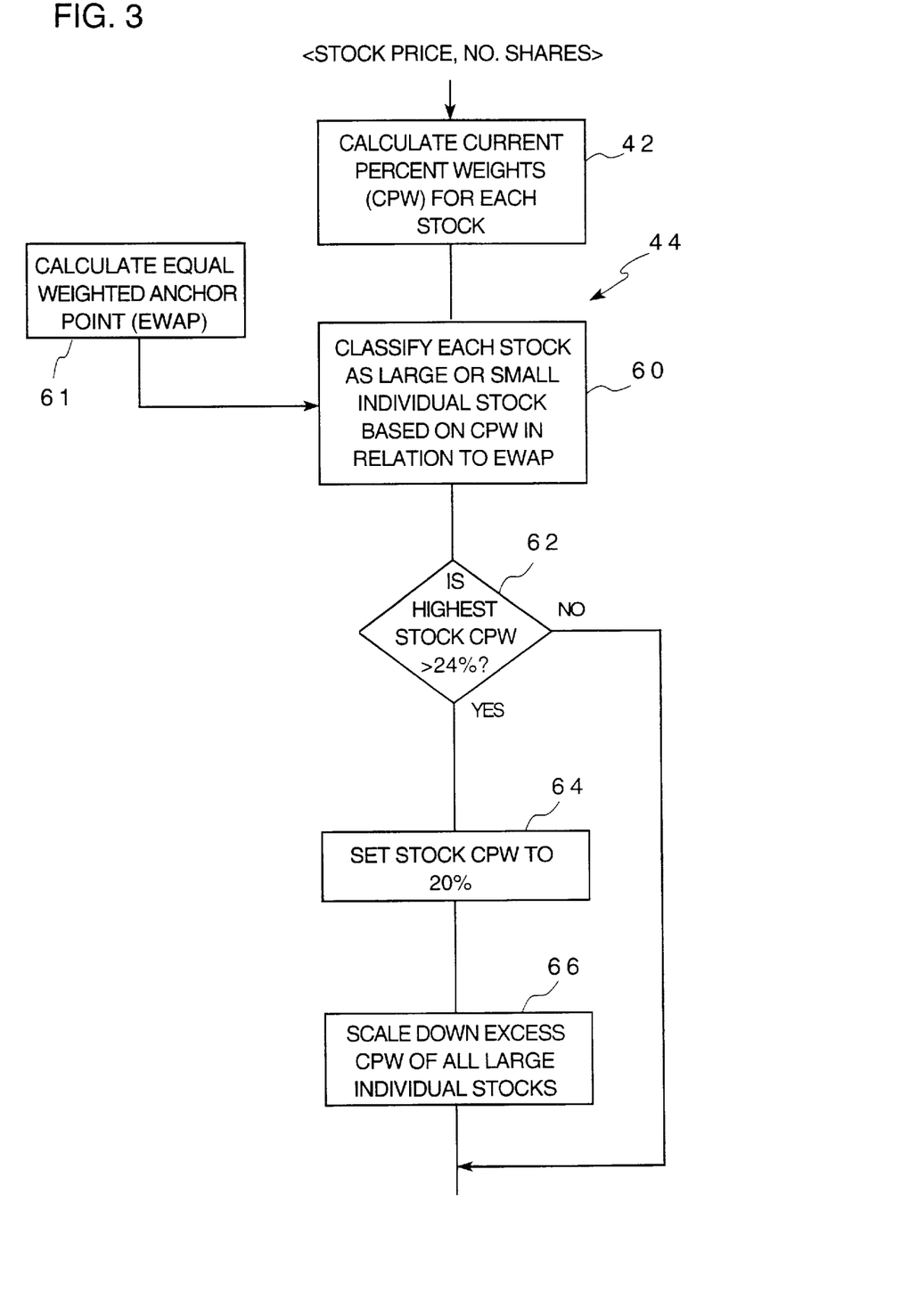
FIG. 3 is a flow chart showing a process used to rescale excess capitalization weight in accordance with a highest capitalized stock in an index.

Referring now to FIG. 3, the stock index rebalancing software 40 classifies 60 stock based upon their CPW in relation to the Equal Dollar Weighted Anchor Point. The Current Percent Weights for each stock and Equal Dollar Weighted Anchor Point are used by the classifier 60 to classify each stock as a Large Individual Stock or a Small Individual Stock, as mentioned above. Thus, if a stock has a Current Percent Weight greater than or equal to the Equal Dollar Weighted Anchor Point, it is classified as a Large Individual Stock. If the stock has a Current Percent Weight less then the Equal Dollar Weighted Anchor Point, it is classified as a small stock.

The process 44 determines 62 if the stock having the highest Current Percent Weight in the index has a Current Percent Weight greater than the first threshold (e.g., 24%). If it does not have a weight greater than 24%, the process 44 exits and returns to process 46 (FIG. 2). If the index does have a stock with a weight greater than 24%, the process 44 scales down the CPW of that stock by setting 64 the stock's Current Percent Weight to a value ($k_1$) below the first threshold (e.g., $k_1$=20%). The process 44 proportionally scales down 66 the CPWs of all of the Large Individual Stocks. In one approach, each Large Individual Stock is scaled so that the proportion of the amount of the stock's new adjusted CPW, in excess of the Equal Dollar Weighted Anchor Point, measured in relation to the total excess weight of the Large Individual Stocks whose weights have been similarly adjusted is the same as a similar measurement based upon the stock's current percent weight before resealing.

Figure 3A:
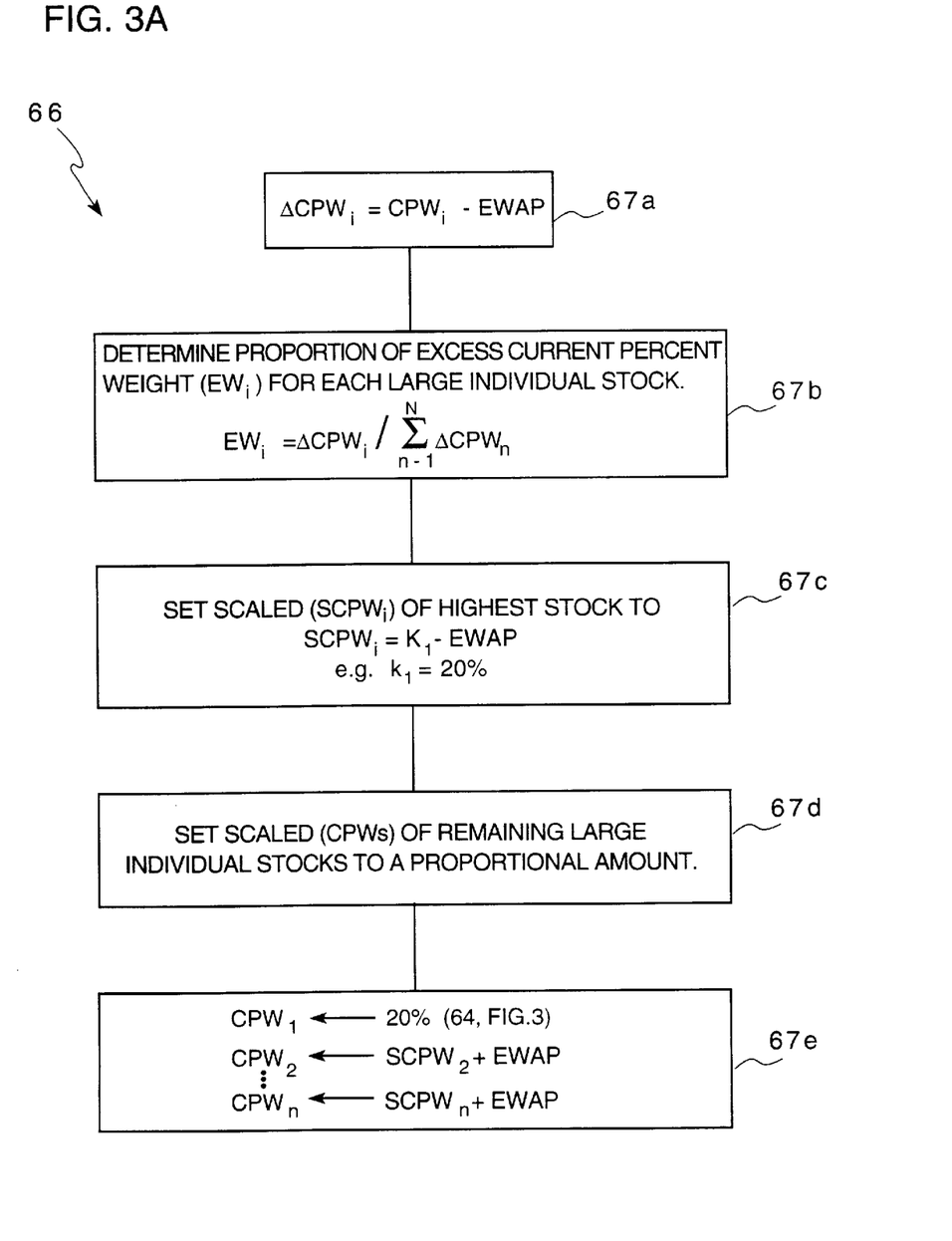
FIG. 3A is a flow chart showing details of the process of FIG. 3.

Referring now to FIG. 3A, the scale down process 66 to scale excess CPW over all large stocks is shown. Current percent weight in excess of the EWAP ($\Delta CPW_1$) (i.e., "excess difference") is determined 67a for each Large Individual Stock by equation 2:

$$\Delta CPW_i = CPW_i - EWAP \qquad \text{Equation 2}$$

for i=1,2, ... N, where N is the last of the Large Individual Stocks.

This value ($\Delta CPW_i$) is used to determine 67b the proportion of excess current percent weight ($EW_i$) for each Large Individual Stock in the index by dividing the excess difference for the stock by the sum of the excess differences of all the Large Individual Stocks, as in equation 3.

$$EW_i = \Delta CPW_i / \Sigma \Delta CPW_n \qquad \text{Equation 3}$$

for n=1,2, ... N, where N is the last of the Large Individual Stocks.

The process 66 sets the current percent weight of the highest weighted stock to a predetermined value as explained above, e.g., 20%, and calculates the current weight percent of that stock above the Equal Dollar Weighted Percent Anchor Point (e.g., 20%—EWAP). The process 66 scales the current percent weights of the remaining Large Individual Stocks in excess of the Equal Dollar Weighted Anchor Point to a proportional amount (SCPW$_i$) given by Equation 4:

$$SCPW_i = EW_i * ((K_1 - EWAP)/EW_H) \qquad \text{Equation 4}$$

for i=2,3 ... N where H represents the highest weighted stock.

The process assigns 67e adjusted current percent weights to each of the Large Individual Stocks by assigning the first predetermined weight, e.g., 20% (64, FIG. 3) to the highest weighted stock and assigning the scaled capitalization weights determined above plus the Equal Dollar Weighted Anchor Point to each of the remaining large capitalized stocks in the index.

Figure 4:
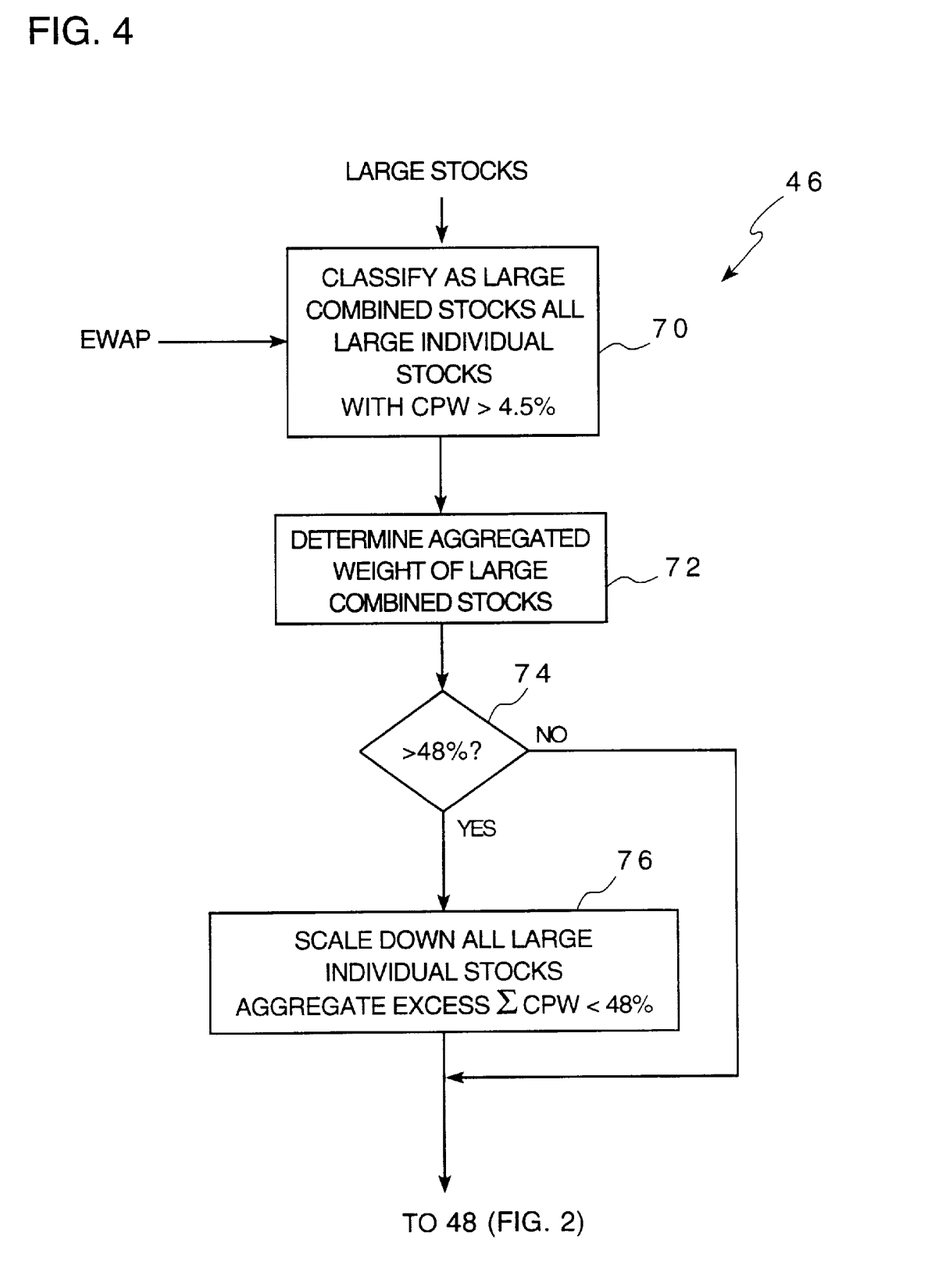
FIG. 4 is a flow chart showing a process to rescale large stocks in accordance with excess capital weight of a subset of large stocks in the index.

Referring to FIG. 4, the index rebalancing software classifies 70 each of the Large Individual Stocks into a sub-classification referred to as Large Combined Stock if a Large Individual Stock has either current percent or adjusted current percent weight greater then a third threshold (e.g., 4.5%).

The process 46 determines 72 the aggregate weight of the Large Combined Stocks and compares 74 this aggregate weight to the second threshold (e.g. 48%). If the aggregate weight exceeds this second threshold, the process 46 scales 76 down the current percent weights of all of the Large Individual Stocks by an amount needed to set the aggregate adjusted current percent weight to a value $K_2$ (e.g., $K_2$=44%) less than the second threshold. Each large stock is scaled in a similar manner as above. That is, each Large Individual Stock is scaled so that the proportion of its newly adjusted weight in excess of the Equal Dollar Weighted Anchor Point measured in relation to the total excess weight of the Large Individual Stocks whose weights have been similarly adjusted is the same as the comparable proportion calculated using the current percent weights of the stocks prior to scaling.

If the second threshold is not exceeded, the process exits. If the process 44 and 46 both exited without rescaling, that can indicate 47 that there is no current requirement to rebalance (FIG. 2) the index.

Figure 4A:
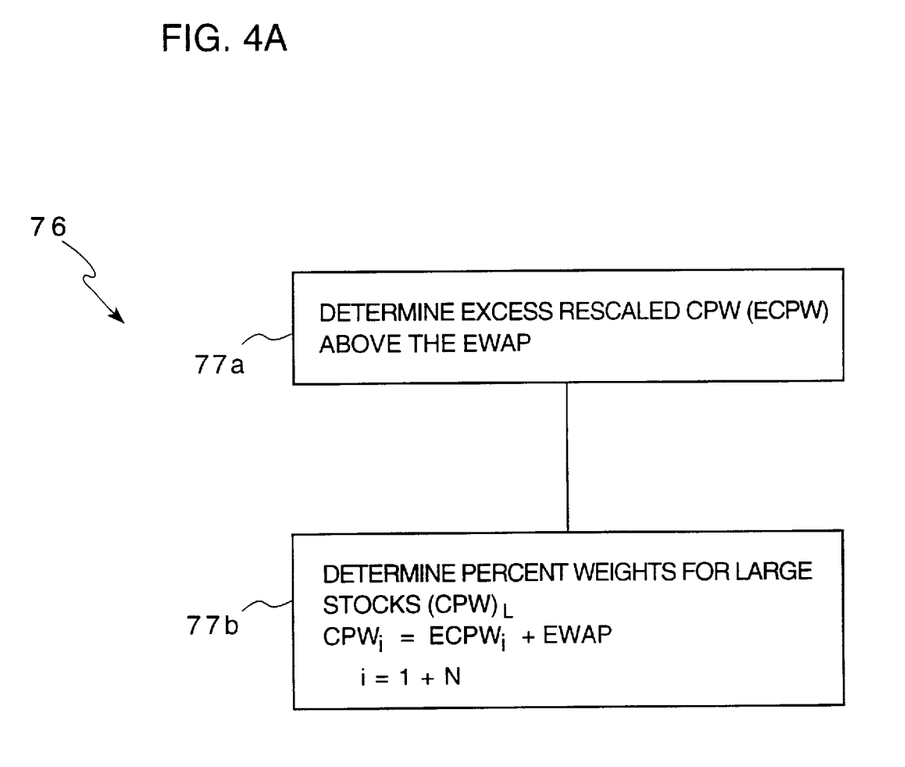
FIG. 4A is a flow chart detailing resealing of FIG. 4.

Referring now to FIG. 4A, an example of scaling 76 all of the Large Individual Stocks in relation to the excess CPW of the Large Combined Stocks is shown. The process 76 determines the excess rescaled CPW above the Equal Dollar Weighted Anchor Point for each of the stocks that are classified as a Large Individual Stock in accordance with Equation 5:

$$ECPW_i = EW_i * ((K_2 - (X*EWAP))/\Sigma EW_x) \qquad \text{Equation 5}$$

where x=1, 2, ... X where X is the last of the Large Combined Stocks and i=1,2, ... N where N is the last of the Large Individual Stocks.

Process 76 adjusts 77b percent weights for the Large Individual Stocks by setting the current percent weights of the Large Individual Stocks to an amount corresponding to the excess rescaled percent weight ECPW$_i$ plus the Equal Dollar Weighted Anchor Point, as in Equation 6.

$$CPW_i = ECPW_i + EWAP \qquad \text{Equation 6}$$

where i=1 to N.

Referring now to FIG. 5, as part of the rebalancing the index rebalancing software 40 redistributes 48 excess weight from the Large Individual Stocks to the Small Individual Stocks. This redistribution 48 is accomplished by calculating 80 an Aggregate Redistribution Percent Weight for the Large Individual Stocks by determining a difference of the aggregate weights of the Large Individual Stocks prior to scaling and after scaling process 44 or scaling process 46 (FIG. 2).

The Aggregate Redistribution Percent Weight is redistributed over the small stocks. Redistribution is accomplished by an iterative scaling process 81. The iterative process 81 scales up the largest of the Small Individual Stocks and remaining Small Individual Stocks by a scale factor. The scale factor is selected to scale up 82 the current percent weight of the largest Small Individual Stock to the Equal Weighted Anchor Point (EWAP). This scale factor is generally related to the reciprocal of the current weight percent for the particular stock.

Each of the remaining Small Individual Stocks are scaled up 84 by that scale factor reduced in proportion to each stock's CPW relative to the CPW of the largest Small Individual Stock. The process 81 calculates 86 the total increase in Current Percent Weight for all of the small stocks and compares 88 the total current percent weight to the Aggregate Redistribution Percent Weight. If the total current percent weight is less than the Aggregate Redistribution Percent Weight, the process 81 will repeat. The next largest Small Individual Stock is scaled up 82 by a second scale factor to have that stock's CPW equal the Equal Weighted Anchor Point. Subsequently, the remaining Small Individual Stocks in the index are scaled up 84 by a second modified scale factor generally as described above and a second calculation 86 is performed to determine the total increase in the Current Percent Weight for the Small Individual Stocks. This is again compared 88 to the Aggregate Redistribution Percent Weight. This process 48 continues until the Current Percent Weight is equal to or greater than the Aggregate Redistribution Percent Weight as determined at 90.

If the Current Percent Weight for the Small Individual Stocks equals the Aggregate Redistribution Percent Weight, the process 81 exits 94. Otherwise, the process 81 will undo 92 the last iteration and redo the last iteration using a further modified scale factor chosen to make the current percent weight of the small stocks exactly equal to the aggregate redistribution percent weight.

Figure 6:
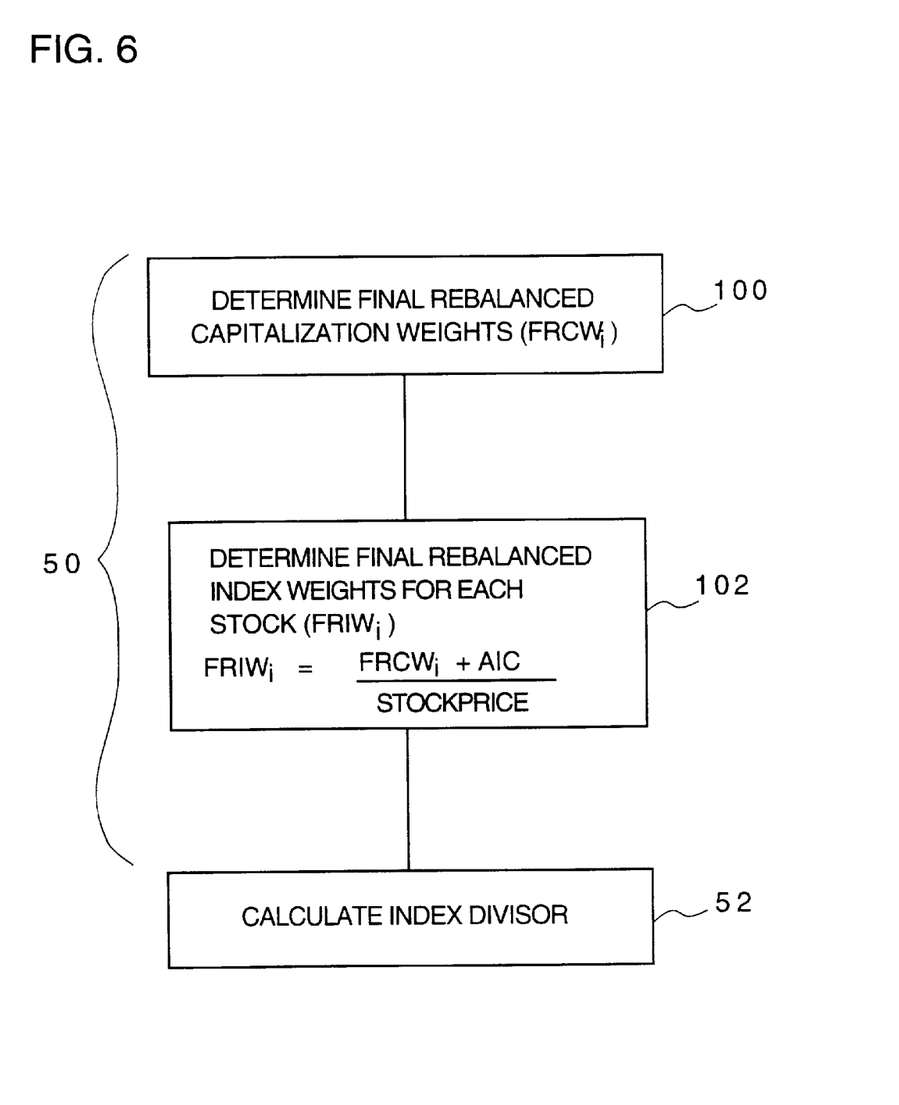
FIG. 6 is a flow chart showing a process to determine a final rebalanced index weight.

Referring now to FIG. 6, the index rebalancing software 40 determines 100 final rebalanced capitalization weights from each of the new capitalization percent weights determined above and will also determine 102 final rebalance index weights for each of the stocks. The final rebalanced capitalization weights are the weights of Large Individual Stocks determined after 44 (FIG. 2) or 46 (FIG. 2) and the weights of the Small Individual Stocks after 48 (FIG. 2). The final rebalanced capitalization weights are used to determine final rebalanced index weights by multiplying the final rebalanced capitalization weight by aggregate dollar capitalization of the index.

After the final index rebalancing weights are determined, the rebalancing software 40 can calculate an index divisor which will be used to divide the aggregate number representing the total of the rebalanced capitalization weights of all of the stocks in the index. This divisor normalizes the index to a value that the index had prior to the effects of rebalancing.

Other Embodiments

Alternative embodiments of the invention are possible. For example, rather than being used to rebalance a stock index, the algorithm can be used to rebalance a portfolio of stocks used in an investment strategy stock index. That is, the invention can be used to track the performance of a group of stocks in a capitalization weighted investment portfolio stock index while minimizing the effect of excess capitalization weight attributed to one or more stocks in the portfolio.

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A computer program product stored on a computer readable medium for rebalancing a capitalization weighted stock index comprises instructions for causing a computer to:

classify stocks in the index as a Large Individual Stock if a stock has a capitalization weight above or equal to a first threshold or as a Small Individual Stock if the stock has a capitalization weight below the first threshold;

scale down the Large Individual Stocks by an excess capitalization weight of the large stocks;

distribute an aggregated excess capitalization weight of the Large Individual Stocks over the capitalization weights of the Small Individual Stocks.

2. The computer program product of claim 1 wherein instructions that cause a computer to distribute further comprise instructions for causing the computer to:

iteratively distribute the excess aggregate capitalization weight of the Large Individual Stocks over the Small Individual Stocks.

3. The computer program product of claim 2 wherein iterating distributing further comprises instructions for causing the computer to:

set the capitalization of a largest one of the Small Individual Stocks to the first threshold; and scale up remaining Small Individual Stocks in accordance with a capitalization amount required to set the largest one to the first threshold.

4. The computer program product of claim 3 wherein the instructions that cause the computer to distribute aggregate excess capitalization weight over Small Individual Stocks further comprise instructions for causing the computer to:

calculate an Equal Dollar Weighting Anchor Point for the stocks in the index;

scale up a largest of the Small Individual Stocks by a scale factor to set a current percent weight of said largest small stock equal to the Equal Dollar Weighting Anchor Point; and scale up remaining Small Individual Stocks by a modified scale factor corresponding to the scale factor used to scale the largest stock of the Small Individual Stocks modified by a value which takes into consideration the proportion of each stock's current percent weight in relation to the current percent weight of the largest Small Individual Stock.

5. The computer program product as recited in claim 4 wherein instructions that distribute further comprises instructions for causing the computer to:

determine the total increase in percentage current weight for the Small Individual Stocks;

compare the change in percent current weight for the Small Individual Stocks to the aggregate percent weight of the Large Individual Stocks;

if the percent current weight is less than the aggregate percent weight of the Large Individual Stocks, further comprises instructions for causing the computer to perform at least one subsequent iteration in which instructions cause the computer to:

scale a subsequent largest one of the Small Individual Stocks by a subsequent scale factor to have a current percent weight of said subsequent largest small stock equal to the Equal Dollar Weighting Anchor Point; and scale up remaining Small Individual Stocks by a subsequent modified scale factor corresponding to the scale factor used to scale the subsequent largest stock of the Small Individual Stocks modified by a subsequent value which takes into consideration the proportion of each stock's current percent weight in relation to the current percent weight of the subsequent highest ranking Small Individual Stock.

6. The computer program product of claim 5 further comprising instructions for causing the computer to determine if the change in percent current weight of the Small Individual Stocks equals the aggregate redistribution percent weight.

7. The computer program product of claim 6 further comprising instructions for causing the computer to:

undo a last one of the at least one iterations if the percent current weight of the Small Individual Stocks exceeds the aggregate redistribution percent weight of the Large Individual Stocks; and rescale the stocks using a further modified scale factor chosen to have the change in percent current weight of the Small Individual Stocks equal the aggregate redistribution percent weight of the Large Individual Stocks.

8. The computer program product of claim 1 further comprising instructions for causing a computer to calculate an Equal Dollar Weighting Anchor Point for the stock components in the index and wherein said first threshold is the Equal Dollar Weighting Anchor Point for the index.

9. The computer program product of claim 8 further comprising instructions for causing the computer to:

calculate from the capitalization weights of each of the stocks in the index current percentage weights corresponding to a percentage of the capitalization weight of a stock in accordance with the total capitalization weight of the index; and wherein the instructions that cause the computer to classify stocks in accordance with capitalization weight causes said computer to classify said stocks in accordance with their current percent weights.

10. The computer program product of claim 1 further comprising instructions for causing the computer to scale Large Individual Stocks by an excess capitalization weight associated with a stock in the index having the highest capitalization weight that is greater than a predetermined threshold.

11. The computer program product of claim 1 further comprising instructions for causing the computer to determine final rebalanced index weights for each stock in the index.

12. The computer program product of claim 11 further comprising instructions for causing the computer to calculate an index divisor in accordance with the final rebalanced index weights.

13. The computer program product of claim 1 wherein the instructions that cause the computer to scale down Large Individual Stocks further comprise instructions that cause the computer to classify the Large Individual Stocks as Large Combined Stocks if the capitalization weight of said Large Individual Stocks exceeds a second threshold;

determine the aggregated capitalization weight of Large Combined Stocks;

scale the weights of each of the Large Individual Stocks by an amount to set a new aggregate weight of the Large Combined Stocks to a value less than the second threshold.

14. The computer program product of claim 13 wherein the instructions that cause the computer to scale weights of each of the Large Individual Stocks further comprise instructions for causing the computer to:

adjust the weights of each of the Large Individual Stocks so that the proportion of the amount of a new adjustment above the first threshold for each of the Large Individual Stocks is substantially the same as a comparable proportion for those of the Large Individual Stocks prior to adjustment.

15. A computer program product stored on a computer readable medium for rebalancing a capitalization weighted stock index comprises instructions for causing a computer to:

request a file containing data corresponding to capitalization of stocks in the index;

classify stocks in the index as a Large Individual Stock if a stock has a capitalization weight above or equal to a first threshold or as a Small Individual Stock if the stock has a capitalization weight below the first threshold;

scale Large Individual Stocks in an index in proportion to an excess capitalization weight associated with a stock in the index having the highest capitalization weight if the weight of the stock is greater than a second threshold;

classify the Large Individual Stocks as Large Combined Stocks if the capitalization weight of said Large Individual Stocks exceeds a third threshold;

rescale the weights of the Large Individual Stocks in accordance with excess capitalization weights of the Large Individual Stocks;

determine excess aggregate capitalization weight of the Large Individual Stocks; and distribute the excess capitalization weight of the Large Individual Stocks over the Small Individual Stocks.

16. A method executed on a computer for rebalancing a capitalization weighted stock index comprises:

classifying stocks in the index as a Large Individual Stock if a stock has a capitalization weight above or equal to a first threshold or as a Small Individual Stock if the stock has a capitalization weight below the first threshold;

classifying the Large Individual Stocks as Large Combined Stocks if the capitalization weight of said Large Individual Stocks exceeds a second threshold;

scaling capitalization weights of Large Individual Stocks by an excess aggregate capitalization weight of the Large Combined Stocks;

distributing an aggregated excess capitalization weight of the Large Individual Stocks over the capitalization weights of the Small Individual Stocks.

17. The method of claim 16 wherein distributing further comprises:

determining excess aggregate capitalization weight of the Large Individual Stocks;

iteratively distributing the excess aggregate capitalization weight of the Large Individual Stocks over the Small Individual Stocks, further comprising:

setting the capitalization of a largest one of the Small Individual Stocks to the first threshold; and scaling up remaining Small Individual Stocks in accordance with a capitalization amount required to set the largest one to the first threshold.

18. The method of claim 16 further comprising:

calculating an Equal Dollar Weighting Anchor Point for the stock components in the index, wherein said first threshold is the Equal Dollar Weighting Anchor Point for the index.

19. The method of claim 18 further comprising:

calculating from the capitalization weights of each of the stocks in the index current percentage weights corresponding to the capitalization weight of a stock in accordance with the total capitalization weight of the index; and wherein classifying stocks in accordance with their market capitalization classifies said stocks in accordance with their current percent weights.

20. The method of claim 16 further comprising:

rescaling excess capitalization weight associated with a stock in the index having the highest capitalization weight which is greater than a predetermined threshold.

21. The method of claim 16 further comprising:

determining final rebalanced index weights for each stock in the index.

22. The method of claim 21 further comprising:

determining an index divisor in accordance with the final rebalanced index weights.

23. The method of claim 16 wherein scaling excess aggregated capitalization weight of Large Combined Stocks further comprises:

summing the weights of each of the Large Combined Stocks.

24. The method of claim 23 wherein distributing allocation of excess capitalization weight further comprises:

adjusting the weights of each of the Large Individual Stocks so that the proportion of the amount of a new adjustment above the first threshold for each of the Large Individual Stocks is substantially the same as the comparable proportion for those of the Large Individual Stocks prior to adjustment.

25. The method of claim 16 wherein distributing excess aggregate capitalization weight over Small Individual Stocks further comprises:

determining an Equal Dollar Weighting Anchor Point for the stock components in the index; and performing at least one iteration of distributing by scaling a largest of the Small Individual Stocks by a scale factor to set a current percent weight of said largest Small Individual Stock equal to the Equal Dollar Weighting Anchor Point; and scaling up remaining Small Individual Stocks by a modified scale factor corresponding to the scale factor used to scale the largest individual stock of the Small Individual Stocks modified by a value which takes into consideration the proportion of each stock's current percent weight in relation to the current percent weight of the largest Small Individual Stock.

26. The method of 25 wherein distributing further comprises:

determining the total increase in percentage current weight for the Small Individual Stocks;

comparing the change in percent current weight for the Small Individual Stocks to the aggregate percent weight of the large stocks;

if the percent current weight is less than the aggregate percent weight of the Large Individual Stocks, scaling a subsequent largest one of the Small Individual Stocks by a subsequent scale factor to have the current percent weight of said subsequent largest Small Individual Stock equal to the Equal Dollar Weighting Anchor Point; and scaling up remaining Small Individual Stocks by a subsequent modified scale factor corresponding to the scale factor used to scale the subsequent largest stock of the Small Individual Stocks modified by a subsequent value which takes into consideration the proportion of each stock's current percent weight in relation to the current percent weight of the subsequent highest ranking Small Individual Stock.

27. The method of claim 26 further comprising:
determining if the change in percent current weight of the smalls individual stocks equals the aggregate redistribution percent weight.

28. The method of claim 27 further comprising:
determining if an aggregate percent current weight of the Small Individual Stocks exceeds the aggregate redistribution percent weight of the large stocks; and, if exceeded, undoing a last one of the at least one of the iterations; and redoing the scaling with a modified scale factor chosen to have the change in percent current weight of the Small Individual Stocks equal the aggregate redistribution percent weight of the large stocks.

29. A computer system comprising:
a processor;
a storage device storing a computer program product for rebalancing a capitalization weighted stock index, said computer program product comprising instructions for causing the processor to:
classify stocks in the index as a Large Individual Stock if a stock has a capitalization weight above or equal to a first threshold or as a Small Individual Stock if the stock has a capitalization weight below the first threshold;
scale down the Large Individual Stocks by an excess capitalization weight of the large stocks; and
distribute an aggregated excess capitalization weight of the Large Individual Stocks over the capitalization weights of the Small Individual Stocks.

30. The computer system of claim 29 wherein the computer program product further comprises instructions that cause the computer to scale down Large Individual Stocks further comprise instructions that cause the computer to:
classify the Large Individual Stocks as Large Combined Stocks if the capitalization weight of said Large Individual Stocks exceeds a second threshold;

determine the aggregated capitalization weight of Large Combined Stocks;

scale the weights of each of the Large Individual Stocks by an amount to set a new aggregate weight of the Large Combined Stocks to a value less than the second threshold.

31. The computer system of claim 29 wherein the computer program product further comprises instructions that cause the computer to scale weights of each of the Large Individual Stocks further comprise instructions for causing the computer to:
adjust the weights of each of the Large Individual Stocks so that the proportion of the amount of a new adjustment above the first threshold for each of the Large Individual Stocks is substantially the same as a comparable proportion for those of the Large Individual Stocks prior to adjustment.

32. The computer system of claim 29 wherein the computer program product further comprises instructions that cause the computer to distribute aggregate excess capitalization weight over Small Individual Stocks further comprise instructions for causing the computer to:
calculate an Equal Dollar Weighting Anchor Point for the stocks in the index;
scale up a largest of the Small Individual Stocks by a scale factor to set a current percent weight of said largest small stock equal to the Equal Dollar Weighting Anchor Point; and
scale up remaining Small Individual Stocks by a modified scale factor corresponding to the scale factor used to scale the largest stock of the Small Individual Stocks modified by a value which takes into consideration the proportion of each stock's current percent weight in relation to the current percent weight of the largest Small Individual Stock.

33. The computer system of claim 29 wherein the computer program product further comprises instructions that cause the computer to distribute further comprises instructions for causing the computer to:
determine the total increase in percentage current weight for the Small Individual Stocks;
compare the change in percent current weight for the Small Individual Stocks to the aggregate percent weight of the Large Individual Stocks;
if the percent current weight is less than the aggregate percent weight of the Large Individual Stocks, further comprises instructions for causing the computer to perform at least one subsequent iteration in which instructions cause the computer to:
scale a subsequent largest one of the Small Individual Stocks by a subsequent scale factor to have a current percent weight of said subsequent largest small stock equal to the Equal Dollar Weighting Anchor Point; and
scale up remaining Small Individual Stocks by a subsequent modified scale factor corresponding to the scale factor used to scale the subsequent largest stock of the Small Individual Stocks modified by a subsequent value which takes into consideration the proportion of each stock's current percent weight in relation to the current percent weight of the subsequent highest ranking Small Individual Stock.

34. The computer system of claim 33 wherein the computer program product further comprises instructions for causing the computer to:
determine if the change in percent current weight of the Small Individual Stocks equals the aggregate redistribution percent weight.

35. The computer system of claim 34 wherein the computer program product further comprises instructions for causing the computer to:

undo a last one of the at least one iterations if the percent current weight of the Small Individual Stocks exceeds the aggregate redistribution percent weight of the Large Individual Stocks; and rescale the stocks using a further modified scale factor chosen to have the change in percent current weight of the Small Individual Stocks equal the aggregate redistribution percent weight of the Large Individual Stocks.

* * * * *